(12) United States Patent
Spanesi

(10) Patent No.: US 7,610,126 B2
(45) Date of Patent: Oct. 27, 2009

(54) APPARATUS FOR DETERMINING THE ALIGNMENT OF THE WHEELS OF A MOTOR VEHICLE

(75) Inventor: Orazio Spanesi, Campodarsego (IT)

(73) Assignee: Spanesi S.p.A, Franzione Cavino (IT)

( * ) Notice: Subject to any disclaimer, the term of this patent is extended or adjusted under 35 U.S.C. 154(b) by 128 days.

(21) Appl. No.: 11/659,943

(22) PCT Filed: Aug. 31, 2005

(86) PCT No.: PCT/EP2005/054271

§ 371 (c)(1),
(2), (4) Date: Feb. 12, 2007

(87) PCT Pub. No.: WO2006/027329

PCT Pub. Date: Mar. 16, 2006

(65) Prior Publication Data

US 2007/0294004 A1    Dec. 20, 2007

(30) Foreign Application Priority Data

Sep. 7, 2004    (IT) .......................... PD2004A0224

(51) Int. Cl.
*G01M 17/00*    (2006.01)

(52) U.S. Cl. .................... 701/29; 701/69; 701/74; 701/70; 180/197; 180/199; 356/155

(58) Field of Classification Search ............ 701/29, 701/30, 41, 69, 70, 74; 700/279; 180/197, 180/199, 201, 204; 356/139.09, 155; 33/203.18, 33/288

See application file for complete search history.

(56) References Cited

U.S. PATENT DOCUMENTS

| 4,615,618 | A |   | 10/1986 | Bailey et al. |
| 4,811,250 | A |   | 3/1989  | Steber et al. |
| 5,488,472 | A | * | 1/1996  | January .............. 356/139.09 |
| 5,870,315 | A | * | 2/1999  | January .............. 700/279 |
| 6,710,866 | B1 |  | 3/2004  | Adolph |

FOREIGN PATENT DOCUMENTS

EP    0 987 514 A    3/2000

* cited by examiner

*Primary Examiner*—Gertrude Arthur Jeanglaud
(74) *Attorney, Agent, or Firm*—Modiano & Associati; Daniel J. O'Byrne; Albert Josif

(57) ABSTRACT

An apparatus for determining the alignment of the wheels of a motor vehicle, which comprises sensing devices adapted to detect the coordinates, with respect to a same reference system, of at least three base points which belong to the supporting surface that supports the motor vehicle for which wheel alignment is to be determined, to detect the coordinates of at least two chassis points identified in symmetrical positions of the chassis of the motor vehicle with respect to the longitudinal centerline plane of the motor vehicle, and to detect the coordinates, with respect to the reference system, of four wheel points, which belong to a preset wheel plane that is at least tangent with respect to the rim of the wheel whose alignment is to be determined.

6 Claims, 5 Drawing Sheets

APPARATUS FOR DETERMINING THE ALIGNMENT OF THE WHEELS OF A MOTOR VEHICLE

BACKGROUND OF THE INVENTION

As is known, motor vehicles involved in an accident are subjected to repairs which generally include work to repair the body.

Body shop specialists, after fixing the damage, often must take the motor vehicle to a center equipped with instruments for measuring and correcting the alignment of the wheels of the motor vehicle, because the wheels of a motor vehicle involved in an accident usually lose their alignment.

These alignment measurement and correction instruments are available at tire specialists or repair shops.

Therefore, after repairing the motor vehicle, the body shop specialist is forced to waste time in moving the vehicle from his location to the approved center for measuring and correcting the alignment of the wheels.

To obviate this problem, some body shop specialists acquire these wheel alignment measurement and correction instruments.

However, it is evident that such a choice entails considerable expenses for the purchase of the necessary instruments and requires a certain amount of space in order to place said instruments within the body shop.

SUMMARY OF THE INVENTION

The aim of the present invention is to provide an apparatus for determining the alignment of the wheels of a motor vehicle that solves the problems noted in the common working practice of body shops.

Within this aim, an object of the present invention is to provide an apparatus for determining the alignment of the wheels of a motor vehicle that can be used by body shops without excessive cost increases for said body shops.

Another object of the present invention is to provide an apparatus for determining the alignment of the wheels of a vehicle that is compact.

A further object of the present invention is to provide an apparatus for determining the alignment of the wheels of a motor vehicle that can be used easily and has low operating costs as well as high operating flexibility.

This aim and these and other objects, that will become better apparent hereinafter, are achieved by an apparatus for determining the alignment of the wheels of a motor vehicle, which comprises:

sensing means, which are adapted to detect the coordinates, with respect to a same reference system, of at least two chassis points identified in symmetrical positions of the chassis of the motor vehicle with respect to the longitudinal centerline plane of said motor vehicle, and are adapted to detect the coordinates, with respect to said reference system, of at least three wheel points which belong to a preset wheel plane that is at least tangent with respect to the rim of the wheel whose alignment is to be determined;

first memory means, which are adapted to store said detected coordinates of said chassis points and said wheel points, first calculation means, which are adapted to calculate the position of said longitudinal centerline plane with respect to said reference system given the coordinates of said chassis points and to calculate the position of said preset wheel plane with respect to said reference system given the coordinates of said wheel points, second memory means, which are adapted to store the calculated position of said longitudinal centerline plane and to store the position of said preset wheel plane, second calculation means, which are adapted to calculate the inclination of said preset wheel plane with respect to said longitudinal centerline plane and are adapted to calculate, by derivation from said calculated inclination, selectively the camber angle, toe-in, steering angle and incidence of the wheel whose alignment is being calculated.

BRIEF DESCRIPTION OF THE DRAWINGS

Further characteristics and advantages of the present invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
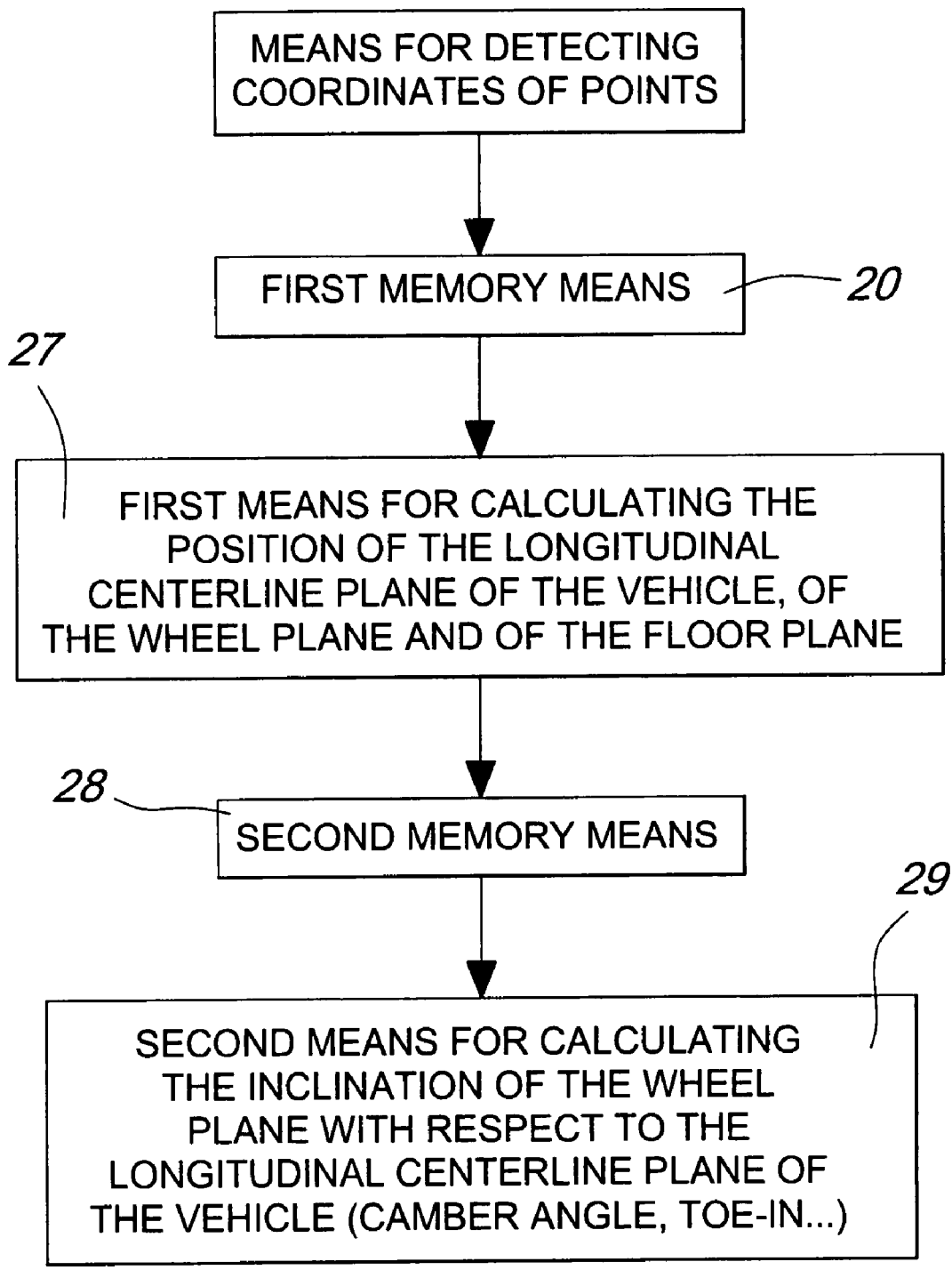
FIG. 1 is a diagram of the interaction of the means that compose an apparatus according to the invention.
Figure 2:
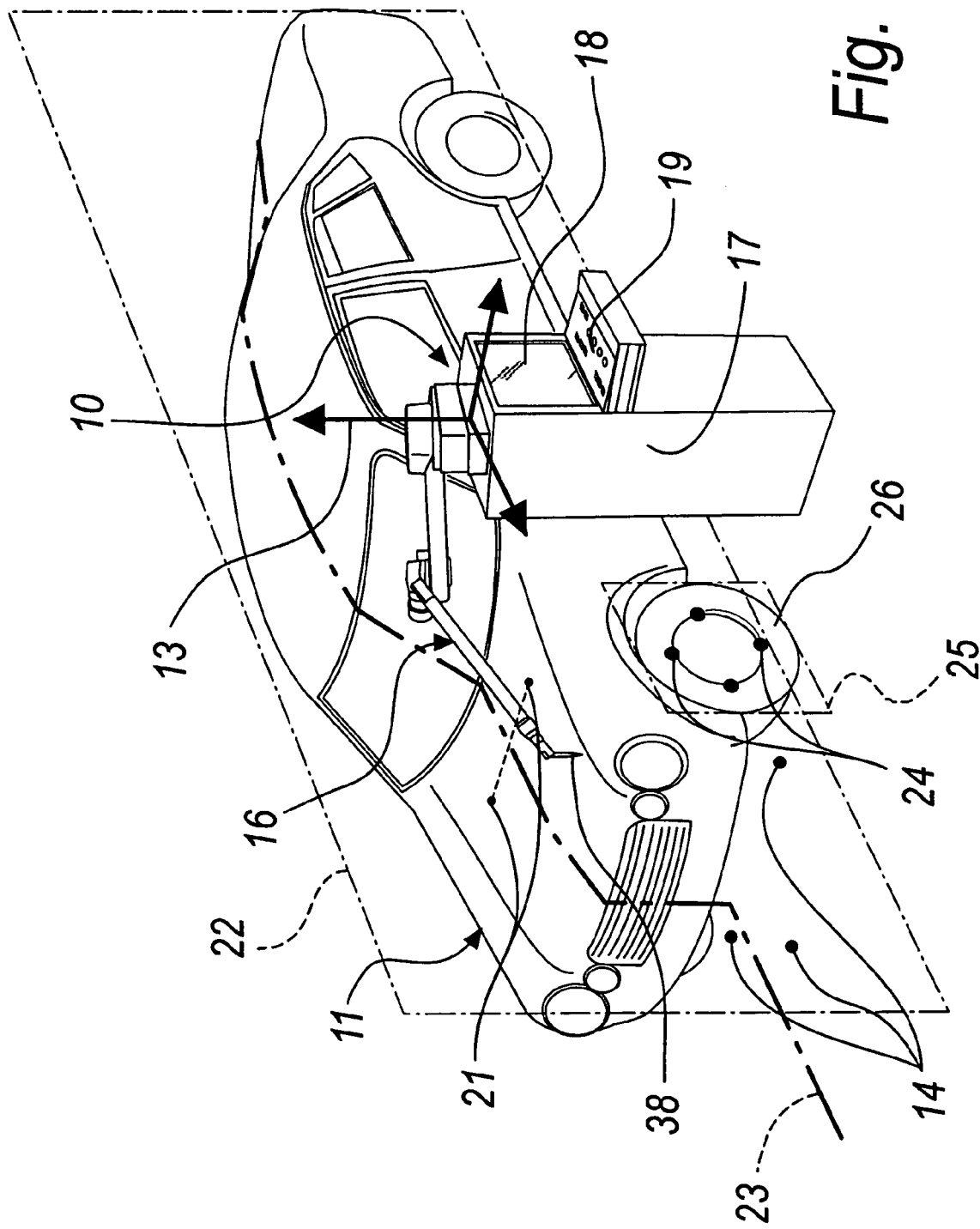
FIG. 2 is a perspective view of a motor vehicle with an apparatus for providing a method according to the invention associated therewith.

With reference to the figures, an apparatus according to the invention is generally designated by the reference numeral 10 and is used in determining the alignment of the wheels of a motor vehicle 11, which is designated by the reference numeral 11 in the figures.

The apparatus 10 comprises sensing means 12, which are adapted to detect the coordinates, with respect to a same reference system designated by the reference numeral 13, of three points, hereinafter termed base points 14, which belong to the supporting surface 15, such as for example the floor of the room in which the motor vehicle 11 is located (or, for example, the surface of the auto lift on which the suspensions rest) and on which said motor vehicle rests.

The three base points 14 may be substantially any (they must be separate); preferably, two of the base points are chosen in the vicinity of the wheels of a same axle and the third base point is chosen in a region that corresponds to the rear (or front) of said motor vehicle 11.

The sensing means 12 comprise an articulated measurement arm 16 of a substantially known type.

The measurement arm 16 is interfaced with an electronic computer 17 provided with a user interface, such as a screen 18 and a keyboard 19.

The coordinates of the three base points 14 are stored by way of first memory means 20, constituted for example by a magnetic memory (not shown in the figures) of the electronic computer 17.

By way of the same sensing means 12, the coordinates of two points, hereinafter referenced as chassis points 21, are detected with respect to said reference system 13; the chassis points are identified in symmetrical positions of the chassis of the motor vehicle 11 with respect to the longitudinal centerline plane 22 of the chassis (the intersection of the longitudinal centerline plane 21 with the motor vehicle 11 is designated by the reference numeral 23).

The two chassis points 21 may be any; it is sufficient for them to be symmetrical with respect to the longitudinal centerline plane 22.

The two chassis points 21 can be determined on particular points of the chassis whose symmetry with respect to the centerline plane 22 is known, such as for example symmetrical points along the perimeter of the hood of the motor vehicle, or very specific structural points of the motor vehicle, such as for example the articulation points of the shock absorbers.

The coordinates of the two chassis points 21 are also stored by means of the first memory means 20.

By way of the same sensing means 12, the coordinates with respect to the same reference system 13 of at least three separate points (preferably four in this embodiment) are also detected; such points are referenced hereinafter as wheel points 24 and belong to a preset wheel plane 25 which is in at least tangent to the rim of the wheel 26 whose alignment is to be determined.

More conveniently, the preset wheel plane 25 advantageously corresponds to the plane that is tangent to the outer side of the rim of the wheel 26 whose alignment is to be determined.

Such wheel plane 25 is perpendicular to the rotation axis of said wheel 26.

The wheel points 24 whose coordinates are measured are chosen along the circumference of the rim of the wheel 26 to which, for example, the balancing weights (not shown in the figures) of the wheel are fixed.

By way of the first storage means 20, the coordinates of the wheel points 24 are stored.

The order in which the coordinates of the base points 14, of the chassis points 21 and of the wheel points 24 are acquired is substantially irrelevant.

The positions, with respect to the reference system 13, of the supporting surface 15, of the longitudinal centerline plane 22 and of the wheel plane 25 are calculated by way of first calculation means 27, which are integrated for example in the electronic computer 17 and comprise an electronic program (not designated by a reference numeral in the figures), given the coordinates of the base points 14, of the frame points 21 and of the wheel points 24.

As is known, a single plane in fact can pass through three points, as in the case of the base points 14 and of the wheel points 24. It is evident that it is possible to detect more than three points in order to determine the plane on which they lie, thus minimizing errors in terms of flatness and measurement.

As regards the position of the longitudinal centerline plane 22, as is known, given the two chassis points 21 and considering the line segment that joins them, it is possible to pass through the centerline of said segment only one plane which is also arranged at right angles to the segment. Such plane is the plane of symmetry for the two chassis points 21.

At this point, the values calculated within the electronic computer 18 regarding the position of the supporting surface 15, the position of the longitudinal centerline plane 22 and the position of the preset wheel plane 25 are stored by way of second storage means 28 on a magnetic memory (not shown in the figures) of the electronic computer 18.

The parameters that describe the position of the longitudinal centerline plane 22 with respect to the reference system 13 and of the wheel plane 25 with respect to said reference system 13, and accordingly with respect to the supporting surface 15, are thus obtained.

By way of second calculation means 29, for example also integrated in the electronic computer 18, it is possible to calculate the inclination of said wheel plane 25 with respect to the longitudinal centerline plane 22.

The choice to also detect the parameters of the supporting surface 15 and therefore to be able to link to them both the longitudinal centerline plane 22 and the wheel plane 25 arises from the need to minimize any errors induced by any abnormal inclination of the motor vehicle due for example to a different compression of the suspensions.

In this manner, it is possible to use the apparatus 10 with the appropriate precision even when the motor vehicle is on the ground.

Figure 3:
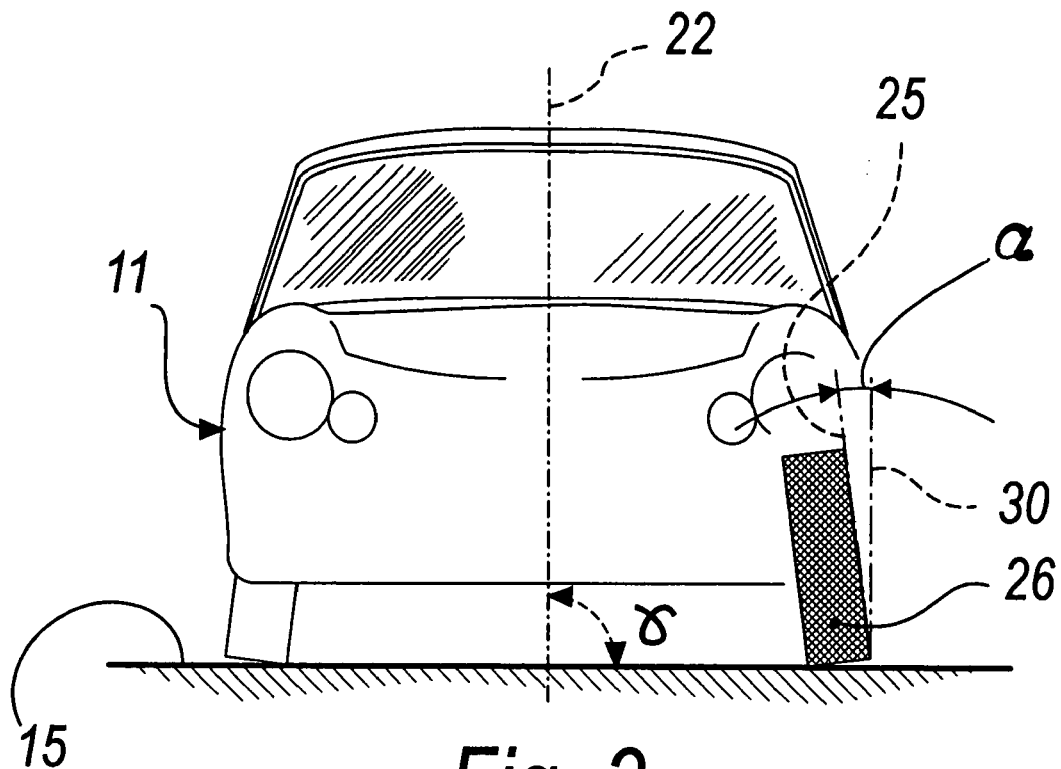
FIG. 3 is a schematic front view of a motor vehicle to which a method according to the invention is applied in order to determine the camber angle of the wheels.

The inclination of the longitudinal centerline plane 22 with respect to the supporting plane 15 is designated by the letter $\gamma$ in FIG. 3.

Figure 4:
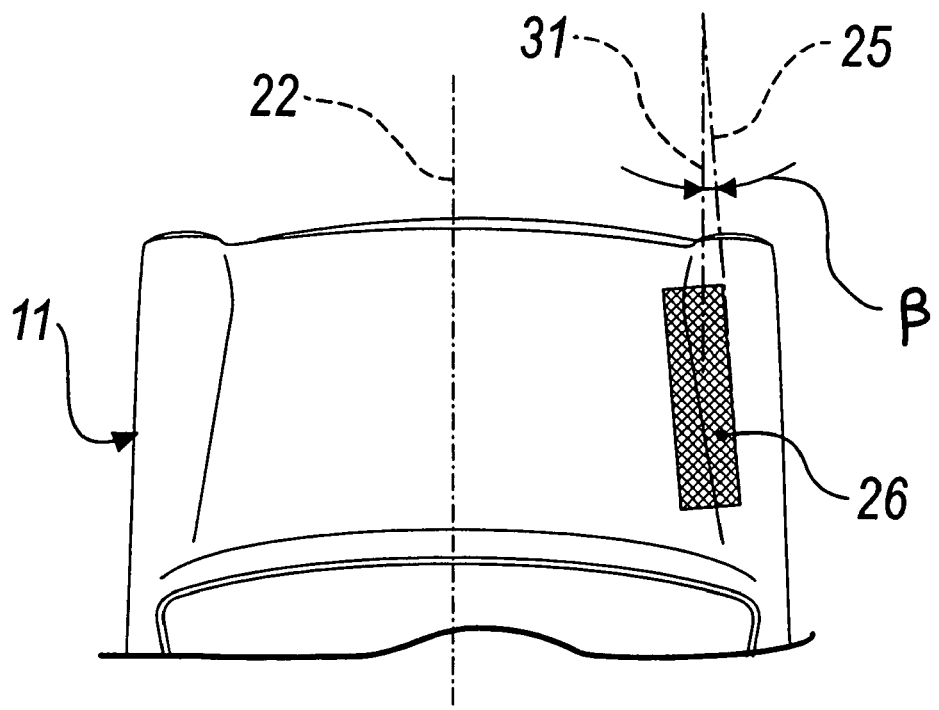
FIG. 4 is a schematic plan view of the motor vehicle to which a method according to the invention is applied in order to determine the toe-in of the wheels.
Figure 5:
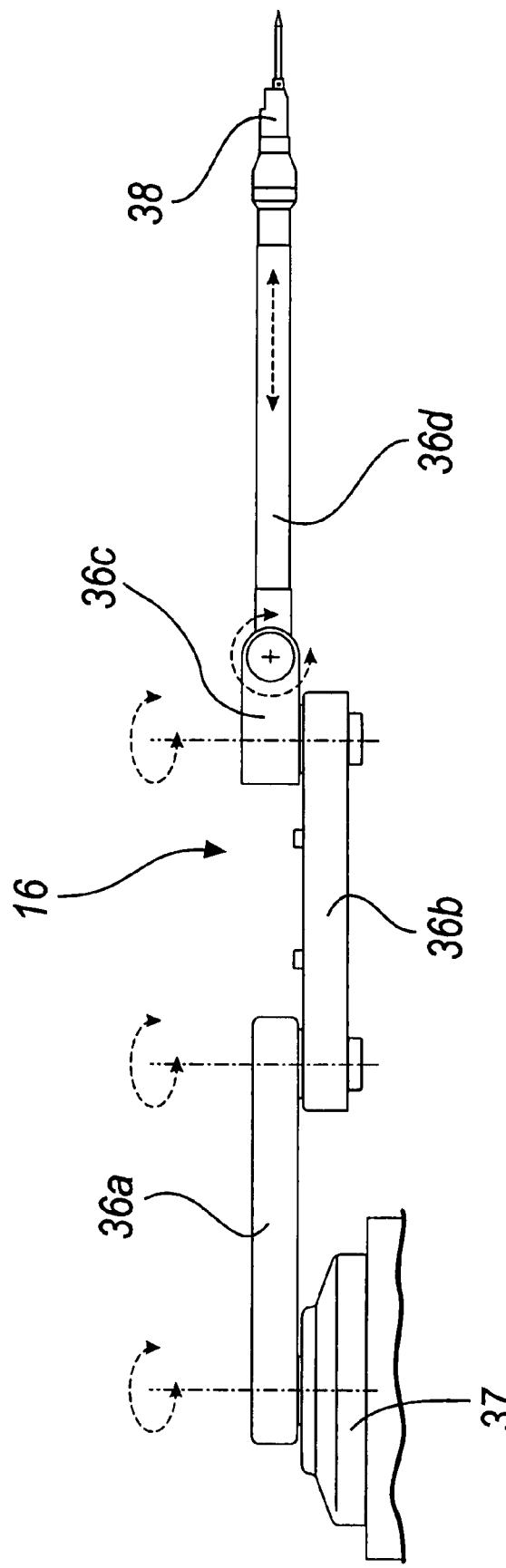
FIG. 5 is a side view of a portion of an apparatus for performing a method according to the invention.

The second calculation means 29, with the aid of the electronic program, allow therefore to calculate the angles $\alpha$ and $\beta$ of the inclination of the preset wheel plane 25 respectively relative to the vertical projection 30 of the longitudinal centerline plane 22 and relative to the horizontal projection 31 thereof. The projections are shown shifted at the wheel plane 25 respectively in FIG. 3 and in FIG. 4.

In the first case, one obtains substantially the camber angle of the wheel 26, while in the second case one obtains the toe-in of the wheel 26 with respect to the longitudinal centerline plane 22.

In this last case, it is sufficient to measure the toe-in of the opposite wheel that is symmetrical with respect to the longitudinal centerline plane 22 in order to obtain the complete toe-in (toe-in is defined substantially as the inclination of the wheels with respect to their parallel arrangement, when viewed from above).

Given the knowledge of the parameters that describe the position of the longitudinal centerline plane 22 and of the wheel plane 25, the second calculation means 29 can determine other wheel alignment parameters, such as for example the axial offset of the wheels of a same axle, the thrust angle of an axle, the steering of a wheel, the difference between the right and left steering of the wheels of an axle (generally the front axle), and the incidence.

Figure 6:
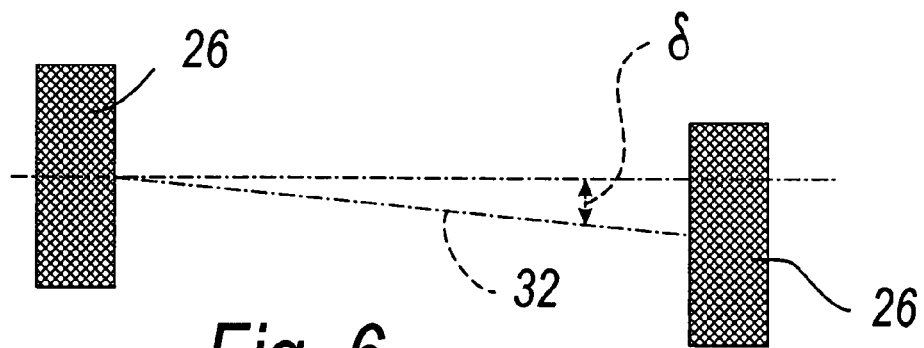
FIG. 6 is a diagram of the axial offset of the wheels of an axle of a motor vehicle.

The axial offset of the wheels of a same axle is defined for example, as shown in FIG. 6, by the value of the angle $\delta$ of inclination of the axis 32 of the axle with respect to the hypothetical value for an axle that is not inclined with respect to the hub of the wheels 26.

Figure 7:
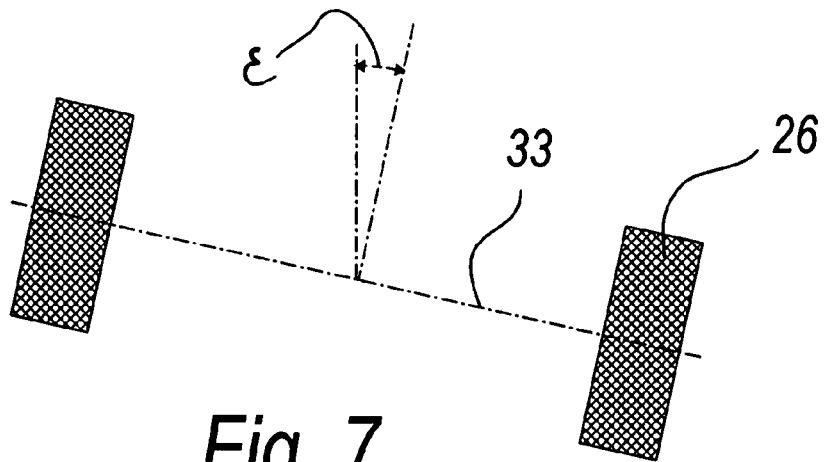
FIG. 7 is a diagram of the thrust angle of the wheels of an axle of a motor vehicle.

The thrust angle of an axle is defined for example, as shown in FIG. 7, by the value of the angle of inclination $\epsilon$ of the axis 33 of the axle (measured from its perpendicular plane) with respect to the longitudinal centerline plane 22 of the motor vehicle 11.

Figure 8:
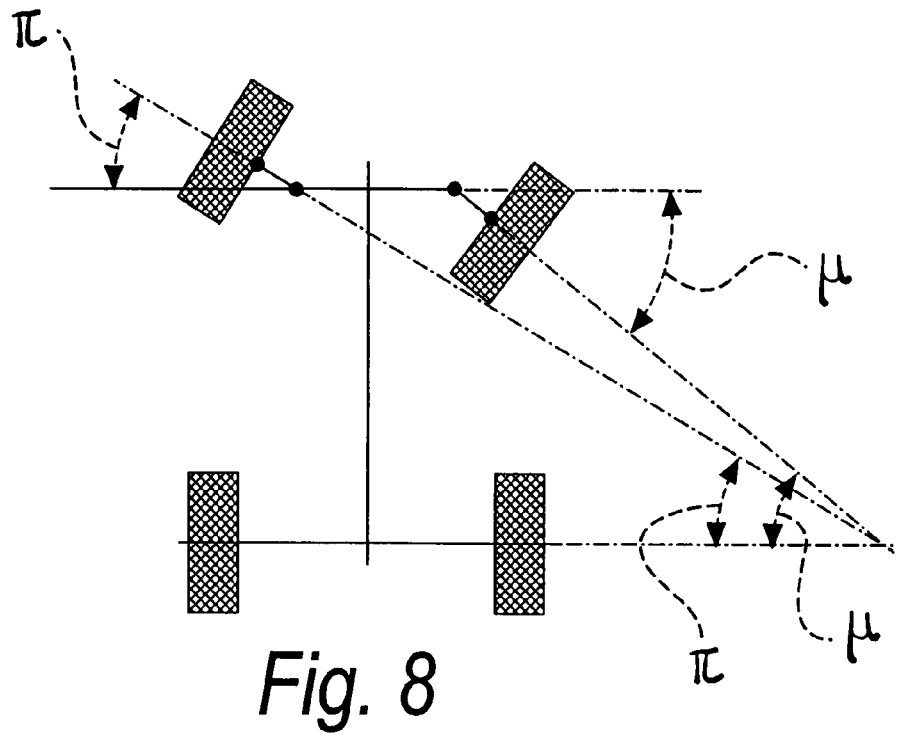
FIG. 8 is a diagram which illustrates the difference in the rightward steering of the front axle of a motor vehicle.

The difference in right or left steering of the wheels of the front axle is defined, for example, as shown in FIG. 8 (right steering), by the difference of the inclination $\pi$ and $\mu$ of the rotation axes 34 of the wheels 26, when they are fully turned (to the right), with respect to the axis 35 of the rear axle.

Incidence (not shown in figures) is generally defined as the inclination, with respect to the vertical, of the arm that connects the hub of the wheel to the suspension and can be calculated in a known manner from the values of the steering of the wheels of the vehicles.

Furthermore, a database is loaded into the electronic computer 17 and comprises the tolerance values of the camber angle, toe-in, steering angle, incidence, axial offset, and thrust angle parameters for given motor vehicles.

Once the parameters of the motor vehicle whose wheel alignment is being determined have been calculated, these values are compared with the values that are present in the database, thus revealing any variations with respect to the tolerance values.

The measurement arm 16 cited above is constituted by four arms, which are mutually articulated in succession, respectively a first arm 36a, a second arm 36b, and a third arm 36c, all of which have a vertical articulation axis.

Of these three arms 36, the first arm 36a is articulated to a support 37, which is fixed to the ground, while the third arm 36c is articulated to a fourth arm 36d.

The fourth arm is articulated to the third arm 36c about a horizontal axis.

Furthermore, the fourth arm 36d can be extended.

A measurement head 38 is mounted on the tip of the fourth arm 36d.

The operation of the measurement arm is simple and known.

At the tip of the measurement head 38 there is a transducer, which once it touches a given point transmits an impulse to the electronic computer by way of electronic connections provided within said arm. Transmission of the signal is dependent on the actuation of a pushbutton control (not shown in the figures), performed by a user.

The rotations of the various arms 36 are detected by encoders (not shown in the figures), which are mounted at the articulations of said arms 36.

By knowing the length of the various arms 36 and their angular position, it is always possible to determine the position of the measurement head with respect to a given reference system.

In this embodiment, the measurement arm 16 is of a substantially known type and substantially corresponds to a type of measurement arm that is used in body shops in order to measure the dimensions of the chassis of motor vehicles before, during and after repair.

Electronic computers provided with a user interface are generally associated with the measurement arms.

Databases with the measurements of commercially available vehicles are loaded into said electronic computers.

An electronic program suitable to calculate the position parameters of the longitudinal centerline plane 22 of the motor vehicle and of the preset wheel plane 25 and to subsequently calculate the values of the camber angle and toe-in, as described above, is then added to said electronic computers.

In practice it has been found that the invention thus described solves the problems connected to the need of body shop specialists to measure and recalibrate the correct alignment of repaired vehicles.

In particular, the present invention provides an apparatus for determining the alignment of the wheels of a motor vehicle which can be used by the body shop specialist also for other purposes in addition to the purpose of determining wheel alignment.

The apparatus is in fact used both as a measurement instrument in order to determine the dimensions of the motor vehicle (and also the dimensions of motorcycles) or of components thereof, and to calculate wheel alignment.

This is allowed substantially by loading onto the electronic computer of the measurement apparatus an electronic program which allows to determine the alignment of the wheels if the coordinates of a series of points measured on said vehicle are given in input.

Body shop specialists, therefore, no longer need to transfer the motor vehicle to a tire specialist or to a repair shop in order to determine wheel alignment, since they can do this directly "in-house", by using an apparatus that is already present in the body shop itself.

It should be noted that it is possible to first detect and store the base points 14, the chassis points 21 and the wheel points 24 and then calculate the positions of the supporting surface 15, of the centerline plane 22 of the motor vehicle and of the wheel plane 25.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to the requirements and the state of the art.

The disclosures in Italian Patent Application No. PD2004A000224 from which this application claims priority are incorporated herein by reference.

What is claimed is:

1. An apparatus for determining the alignment of the wheels of a motor vehicle, comprising:

sensing means, which are adapted to detect coordinates, with respect to a same reference system, of at least two chassis points identified in symmetrical positions of the chassis of the motor vehicle with respect to a longitudinal centerline plane of said motor vehicle, and are adapted to detect the coordinates, with respect to said reference system, of at least three wheel points which belong to a preset wheel plane that is at least tangent with respect to the rim of the wheel whose alignment is to be determined;

first memory means, which are adapted to store said detected coordinates of said chassis points and said wheel points, first calculation means, which are adapted to calculate the position of said longitudinal centerline plane with respect to said reference system given the coordinates of said chassis points and to calculate the position of said preset wheel plane with respect to said reference system given the coordinates of said wheel points, second memory means, which are adapted to store the calculated position of said longitudinal centerline plane and to store the position of said preset wheel plane, second calculation means, which are adapted to calculate an inclination of said preset wheel plane with respect to said longitudinal centerline plane and are adapted to calculate, by derivation from said calculated inclination, selectively, a camber angle, toe-in, steering angle and incidence of the wheel whose alignment is being calculated.

2. The apparatus of claim 1, wherein said second calculation means are adapted to calculate, by derivation from the calculation of said inclination of said preset wheel plane with respect to said longitudinal centerline plane, selectively the axial offset and the thrust angle of pairs of wheels of a same axle of said motor vehicle.

3. The apparatus of claim 1, wherein said sensing means are further adapted to detect the coordinates of at least three base points which belong to the supporting surface on which the motor vehicle rests, said first memory means being further adapted to store said detected coordinates of said at least three base points, said first calculation means being further adapted to calculate the position of said longitudinal centerline plane with respect to said reference system given the coordinates of said chassis points.

4. The apparatus of claim 1, wherein said preset wheel plane is perpendicular to the rotation axis of said wheel, said at least three wheel points being detected on a circumference that belongs to the rim of said wheel.

5. The apparatus of claim 1, wherein said sensing means comprise at least one articulated measurement arm, which is interfaced with an electronic computer provided with a user interface and with an electronic program, said first and second memory means and said first and second calculation means being integrated in said electronic computer with said electronic program.

6. The apparatus of claim 5, wherein a database is loaded into said electronic program and stores the tolerance values of the camber angle, toe-in, steering angle, incidence, axial offset, and thrust angle parameters for given motor vehicles.

* * * * *